Figure 1:
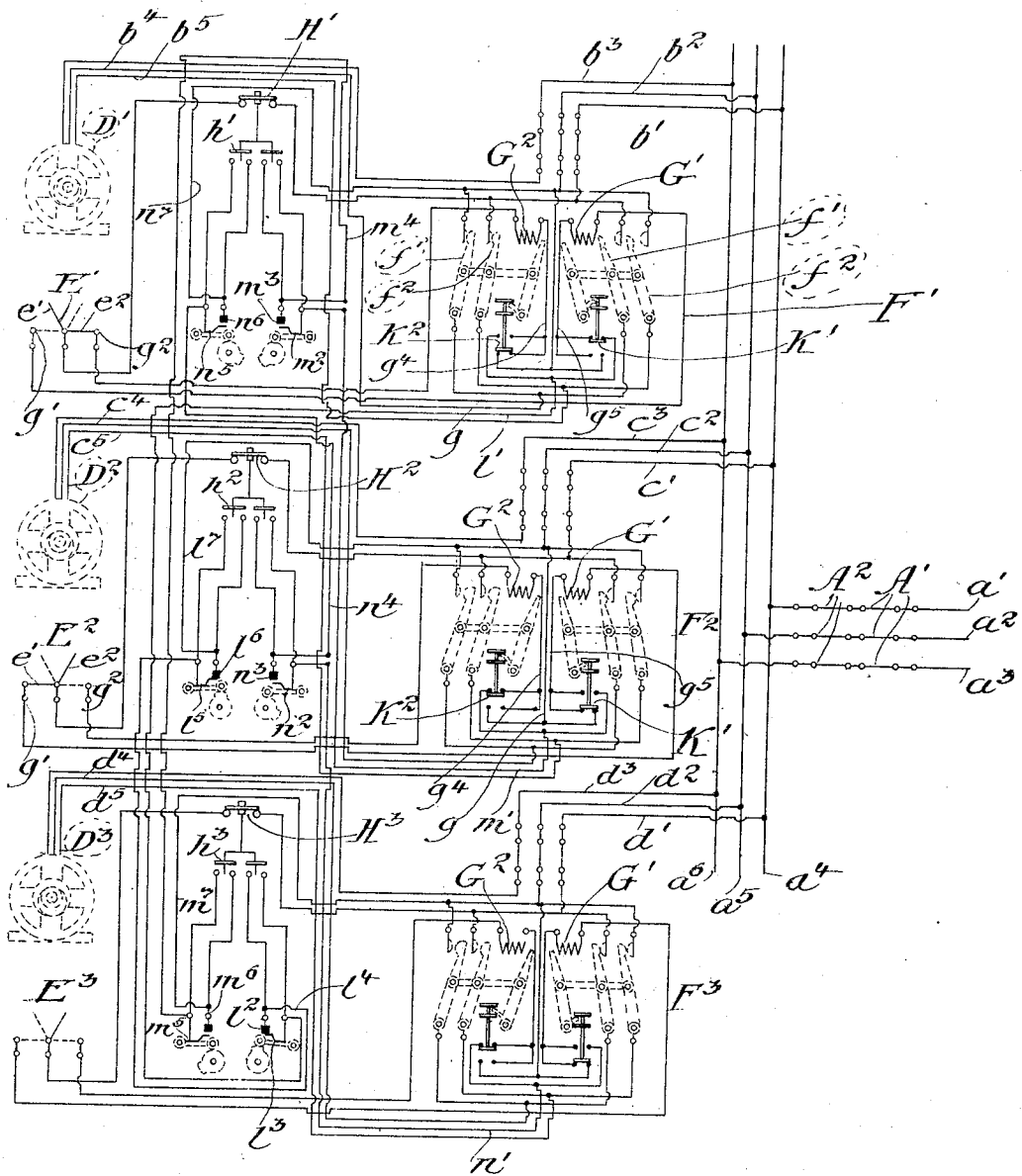

F. BALZER.
SYSTEM FOR CONTROLLING ELECTRICALLY DRIVEN MACHINES.
APPLICATION FILED MAY 12, 1915.

Patented Aug. 28, 1917
3 SHEETS—SHEET 1.

F. BALZER.
SYSTEM FOR CONTROLLING ELECTRICALLY DRIVEN MACHINES.
APPLICATION FILED MAY 12, 1915.
1,238,082.
Patented Aug. 28, 1917.
3 SHEETS—SHEET 2.
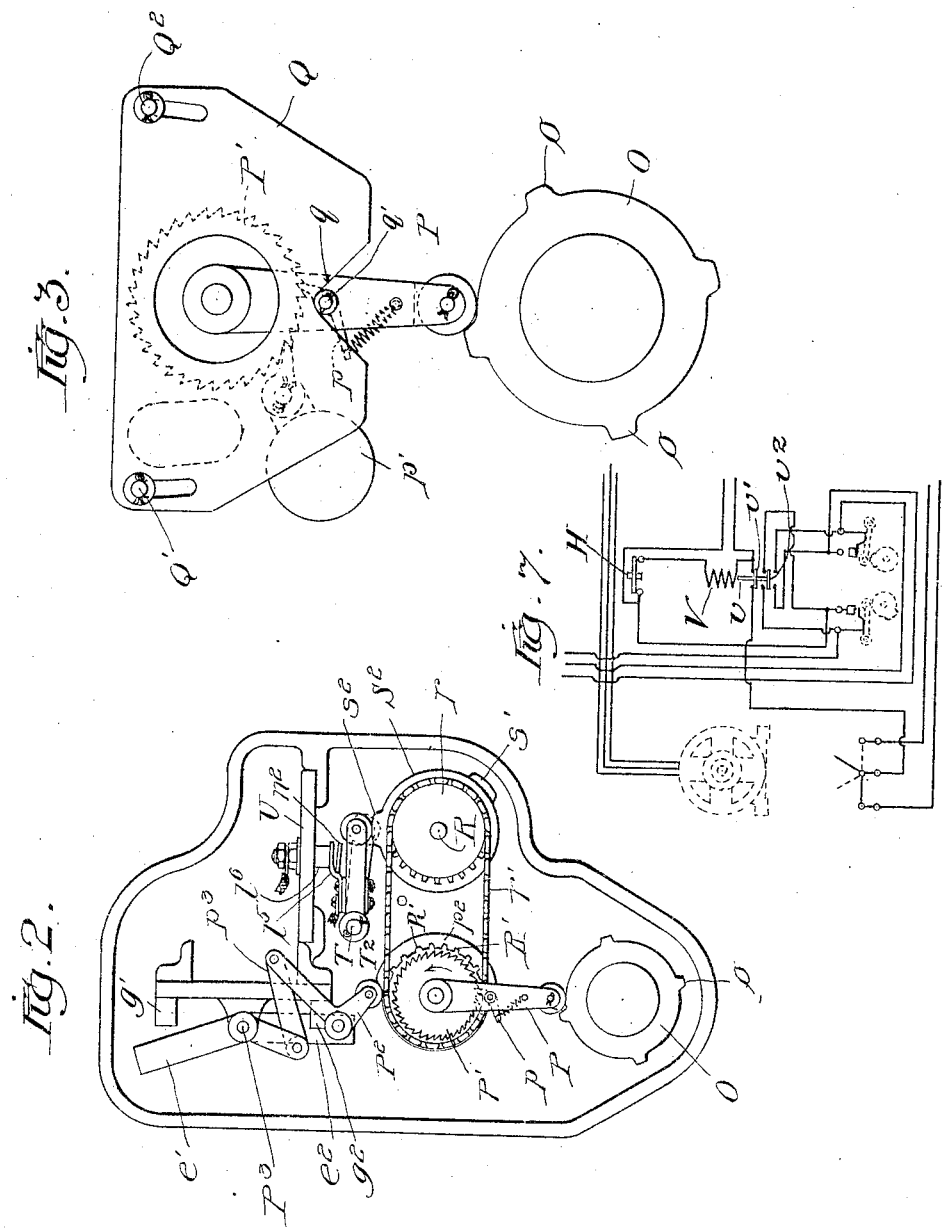
Witness:
H. S. Gaither
Inventor:
Fritz Balzer
By Sheridan, Wilkinson & Scott
Attorneys.

F. BALZER.
SYSTEM FOR CONTROLLING ELECTRICALLY DRIVEN MACHINES.
APPLICATION FILED MAY 12, 1915.
1,238,082.
Patented Aug. 28, 1917.
3 SHEETS—SHEET 3.
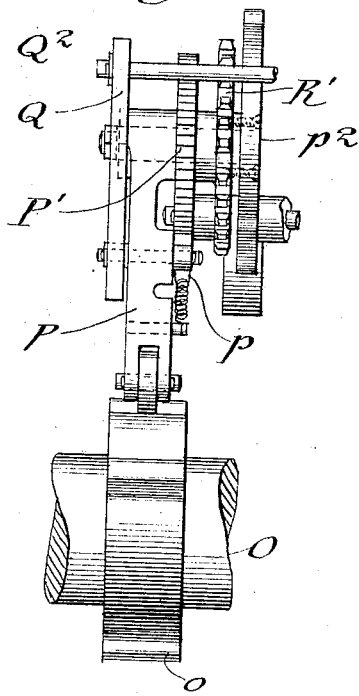
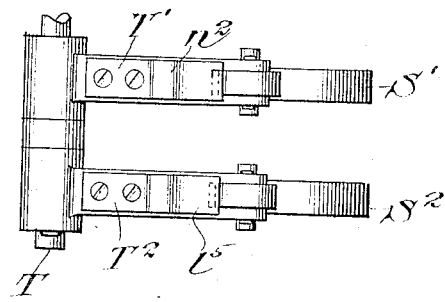
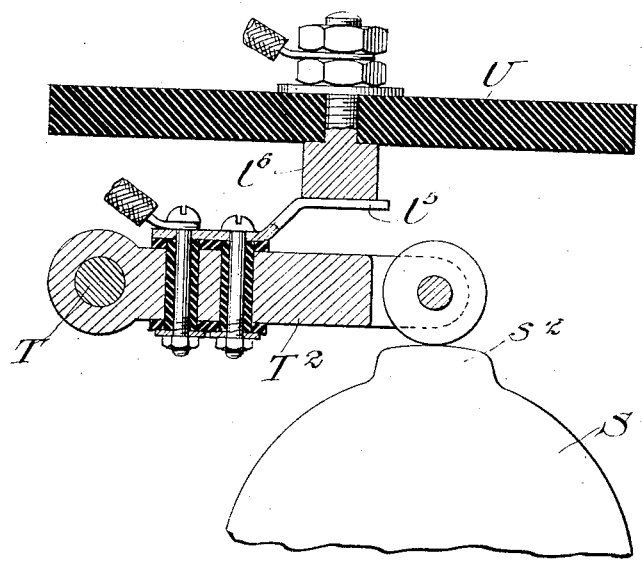
Inventor:
Fritz Balzer
By Sheridan, Wilkinson & Scott
Attorneys.

UNITED STATES PATENT OFFICE.

FRITZ BALZER, OF CHICAGO, ILLINOIS, ASSIGNOR TO TROY LAUNDRY MACHINERY COMPANY, A CORPORATION OF NEW YORK.

SYSTEM FOR CONTROLLING ELECTRICALLY-DRIVEN MACHINES.

1,238,082.  Specification of Letters Patent.  Patented Aug. 28, 1917.

Application filed May 12, 1915. Serial No. 27,660.

*To all whom it may concern:*

Be it known that I, FRITZ BALZER, a subject of the Emperor of Germany, residing at Chicago, in the county of Cook and State of Illinois, have invented certain new and useful Improvements in Systems for Controlling Electrically-Driven Machines, of which the following is a specification.

My invention relates in general to an apparatus for reversing in succession the moving parts of a plurality of machines, and more particularly to a system for automatically serially reversing the direction of rotation of the motors of the cylinders of a plurality of washing machines.

In the operation, by a common source of power, of a plurality of machines, each comprising a movable member, the direction of movement of which is periodically reversed, such for instance as cylinder washing machines, it is desirable that the reversing of no two of the machines should occur simultaneously, inasmuch as the starting of the rotary members requires a maximum consumption of power, and obviously for economic reasons such maximum consumption of power should occur serially and not simultaneously in the several machines. The primary object of my invention is to provide a system for periodically reversing in succession the moving members of a plurality of machines operated by a common source of power, in which the reversing of each member will be controlled by the moving members of all of the other machines.

A further object of my invention is to provide a controlling system for the operation of a plurality of machines, each having a moving member, in which the reversing of each machine will be controlled both by its own moving member and by the moving members of all of the other machines, and in which when any one machine is rendered inoperative it will no longer control the reversing of the machines remaining in operation.

A still further object of my invention is to provide a plurality of electrically-driven cylinder washing machines with controlling mechanism governed by the rotation of the cylinders of all of the machines to periodically reverse in succession the cylinders of the several machines.

A final object of my invention is to provide an efficient system for controlling the reversing of a plurality of machines, in which the reversing of the several machines will automatically occur at predetermined successive intervals.

My invention will be more fully disclosed hereinafter with reference to the accompanying drawings, in which the same is illustrated and described as embodied in a convenient and practical form, and, in which,—

Figure 1 is a diagrammatic view;

Fig. 2 an elevational view of the controlling mechanism of each machine, parts being removed for clearer illustration;

Fig. 3 an elevational view of the means for actuating the controlling mechanism by the rotating member of a machine;

Fig. 4 a side elevational view looking from the right in Fig. 3;

Fig. 5 an enlarged plan view of the switches operated by each machine for controlling the circuits of the other machines in the group;

Fig. 6 an enlarged detail view showing in vertical section one of the switches shown in plan in Fig. 5, and, Fig. 7 a diagrammatic view of a modification of the switch of each machine for controlling the operation thereof.

Similar reference characters are used to designate similar parts in the several figures of the drawings. My invention relates in general to an interlocking controlling system for a plurality of machines, each comprising a rotary member in which each machine not only effects its own periodic reversing, but also controls the reversing of the other machines, so that the several machines may be reversed serially at predetermined intervals. My invention is not limited in its operation to any particular number of machines, nor to any particular character of machines. For purposes of illustration, however, I have shown and described the same as applied to three cylinder washing machines, each actuated by a separate electric motor, but all operated from the same three-phase circuit. My invention may be, however, equally well applied to machines, the driving motors of which are operated by a two-phase, or a direct current, or single phase, circuit.

Before describing my invention in connection with the plurality of machines to which it is applied, I will briefly describe the mechanism at each of the machines utilized in the practice of my invention in the particular form herein disclosed.

Referring to Figs. 2, 3 and 4, reference letter O designates a rotary shaft which may be either the trunnion fixed to one end of the cylinder of a washing machine, or may be a counter-shaft driven through any suitable power connection by a trunnion of the cylinder of a washing machine, or any other moving member of a machine, the reversing of which is to be controlled. Fixed to the shaft O is a plurality of radial projections $o$ which successively engage the lower end of an oscillating lever P. The lever P is provided with a pawl $p$ which engages the teeth on a ratchet wheel $P^1$, so as to rotate the ratchet wheel the distance of one tooth at each oscillation of the lever P by the contact therewith of one of the projections $o$. A gravity pawl $p^1$ retains the ratchet wheel $P^1$ as it is rotated step by step. Fixed to the ratchet wheel is a cam $p^2$, the periphery of which engages one arm of a bell crank lever $P^2$. The upper arm of this bell-crank lever is connected by a link $p^3$ with the crank arm of a rock-shaft $P^3$. Carried by this rock-shaft are oppositely projecting contact blades $e^1$ and $e^2$, which alternately engage and disengage fixed electric contacts $g^1$ and $g^2$, respectively. The alternate engagement of the movable contacts $e^1$ and $e^2$ with the fixed contacts $g^1$ and $g^2$ controls the operation of a magnetic reversing switch for effecting the periodic reversal of the current to the motor which operates the machine.

The mechanism above described does not in itself constitute my present invention, inasmuch as the same forms the subject-matter of my co-pending applications, Serial Nos. 799,944, filed November 8, 1913, and 6940, filed February 8, 1915, and the same need not, therefore, be described in greater detail. For convenient reference, however, I have shown in Fig. 3 the means for returning the oscillating lever P into the path of the projections $o$ after each oscillation thereby, the same consisting of a weighted plate Q suspended from studs $Q^1$ and $Q^2$ extending through slots in the plate. The lower edge of the plate Q is provided with a recess $q$, the downwardly diverging edges of which engage a stud $q^1$ on the lever P, so that each oscillation of the lever also oscillates the weighted plate Q, the latter then serving to return the lever into the path of the projections $o$ in the manner fully disclosed in my said co-pending applications.

R designates a stub-shaft suitably mounted adjacent the shaft O and rotated thereby through suitable power connections, such power connections being shown as comprising a sprocket wheel $r$ fixed to the shaft R, which is connected by a sprocket chain $r^1$ with a sprocket wheel $R^1$ fixed to the cam disk $p^2$. The rotation of the cam disk by the shaft O, therefore, rotates in synchronism therewith the shaft R. Fixed to the shaft R are cam disks $S^1$ and $S^2$, having on the peripheries thereof, respectively, projections $s^1$ and $s^2$. Fulcrumed upon a rod T, suitably mounted in proper relation to the shaft R, are levers $T^1$ and $T^2$, the ends of which rest upon the peripheries of the cam disks $S^1$ and $S^2$, respectively, so that the engagement of the projections $s^1$ and $s^2$ with the ends of the levers lifts them upwardly and permits them to fall after passing out of contact with them. Carried by and insulated from the levers $T^1$ and $T^2$ are resilient electrical contacts $n^2$ and $l^5$, respectively. Fixed electrical contacts $l^6$ and $n^3$ are located in positions to be engaged by the resilient contacts $l^5$ and $n^2$ when the levers $T^2$ and $T^1$ are oscillated upwardly by the projections on the cam disks. The movable contact $l^5$ and fixed contact $l^6$ are in the circuit which controls the reversing of one of the other machines in the group, while the fixed and movable contacts $n^2$ and $n^3$ are in the circuit which controls the reversing of the third machine in the group.

Referring to the diagrammatic view, Fig. 1, reference characters $a^1$, $a^2$ and $a^3$ indicate the mains of the supply current, which are connected with suitable switches $A^1$, and fuses $A^2$ with busbars $a^4$, $a^5$ and $a^6$, respectively. Circuits lead from the busbars to the motors and controlling mechanisms of the machines in the group, which mutually control the reversing of their driving motors.

Reference characters $D^1$, $D^2$ and $D^3$ indicate electric motors, each of which is connected to the rotary member of a machine, such for instance as the cylinder of washing machine. Reference characters $E^1$, $E^2$ and $E^3$ indicate switches, such as that shown in Fig. 2, which respectively control the magnetic reversing switches of the motors $D^1$, $D^2$ and $D^3$. $F^1$, $F^2$ and $F^3$ designate, respectively, the reversing switches of the motors $D^1$, $D^2$ and $D^3$. $H^1$, $H^2$ and $H^3$, respectively, indicate switches for individually controlling the operation of the motors. Reference characters $n^5$ and $n^6$, and $m^2$ and $m^3$ designate the make and break switches operated by cam disks, such as $S^1$ and $S^2$ in Figs. 2, 5 and 6, rotated by the movable member of the machine driven by the motor $D^1$. The contacts $n^5$ and $n^6$ are in the circuit of the reversing switch of the motor $D^3$, while the make and break contacts $m^2$ and $m^3$ are in the circuit of the reversing switch of the motor $D^2$. The movable member of the machine driven by the motor $D^1$, therefore, controls the circuit of the reversing switch of each of the other machines in the group.

$n^2$ and $n^3$, and $l^5$ and $l^6$ indicate the two pairs of make and break contacts actuated by the movable member of the machine driven by the motor $D^2$, the former pair being located in the circuit of the reversing switch of the motor $D^3$, and the latter in the circuit of the reversing switch of the motor $D^1$. $m^5$ and $m^6$, and $l^2$ and $l^3$, indicate the two pairs of make and break contacts actuated by the rotary member of the machine driven by the motor $D^3$, the former pair being located in the circuit of the reversing switch of the motor $D^2$, and the latter pair in the circuit of the reversing switch of the motor $D^1$.

The several circuits will now be described in connection with an explanation of the operation of the invention as diagrammatically shown in Fig. 1.

*Circuits of motor $D^1$.*

When the switch $H^1$ is closed a current passes from the main $a^3$ to the busbar $a^6$, to the lead $b^3$, through the motor $D^1$, leads $b^4$ and $b^5$ connecting the motor $D^1$ to the reversing switch $F^1$, the former lead being connected with each of the movable contacts $f'$—$f'$ of the reversing switch $F^1$, which are alternately operated to engage fixed contacts connected with leads $b^1$ and $b^2$ extending to the busbars $a^4$ and $a^5$, and thence to the mains $a^1$—$a^2$. The lead $b^5$ extending from the motor $D^1$ is connected with the movable contacts $f^2$—$f^2$ of the reversing switch $F^1$, which are alternately operated to engage fixed contacts connected respectively with the leads $b^1$—$b^2$. It is, therefore, evident that the motor will be reversed in the well-known manner upon each operation of the reversing switch $F'$.

The circuit of the reversing switch $F^1$ is as follows: When the rocking switch $E'$ is in the position indicated, with the movable contact $e^2$ in engagement with the fixed contact $g^2$, the circuit extends from the lead $b^1$ through the push-button switch $H^1$, to the pivoted end of the movable contact $e^2$, thence to fixed contact $g^2$, thence through the connecting lead to the coil $G^2$ of the reversing switch $F'$, thence through lead $g^4$ to movable contact $K^2$, to lead $g$, thence to lead $b^2$, completing the circuit for retaining the reversing switch in the position shown. Assuming that the rocking switch $E'$ has been oscillated by the rotation of the member driven by the motor $D^1$, so that the contact $e^1$ engages the contact $g^1$, the circuit through the coil $G^2$ is interrupted so that the movable contacts $f^1$—$f^2$ actuated thereby fall away from the fixed contacts, and the movable contact $K^2$ is lifted to connect the lead $g^4$ with the lead $b^1$. Such movement of the rocking switch $E'$ closes a circuit as follows through the coil $G^1$ of the reversing switch $F^1$. The contact $g^1$ through the connecting lead to the coil $G^1$, thence through the lead $g^5$ to the movable contact $K^1$, to the lead $b^1$, to movable contact $l^3$, thence to fixed contact $l^2$ to lead $l^4$ to movable contact $l^5$, to fixed contact $l^6$, thence through lead $l^7$ and lead $c^2$ to busbar $a^5$, thereby completing the circuit through the coil $G^1$ which actuates the reversing switch $F'$ to reverse the motor $D^1$. The energization of the coil $G^1$ effects the lowering of the contact $K^1$ so as to close the circuit through the coil $G^1$ directly from the lead $g^5$ to the lead $g$, and lead $b^2$ to the busbar $a^5$. The reversing switch therefore continues in said position until the switch $E^1$ is oscillated to break the circuit by disengaging the contact $e^1$ from the fixed contact $g^1$.

It will be noted that the circuit through the coil $G^1$ of the reversing switch $F^1$ is only completed when the movable members of the machines driven by motors $D^3$ and $D^2$ occupy such positions as to close the respective pairs of contacts $l^2$ and $l^3$, and $l^5$ and $l^6$. The projections on the cam disks which close the contacts of the two pairs are so located as to be rotated in unison by the movable members of the machines driven by the motors $D^2$ and $D^3$. Hence the current is only completed through the coil $G^1$ of the reversing switch $F^1$ at a time when neither of the motors $D^2$ and $D^2$ is reversed, inasmuch as the projections on the cam disks rotated by each motor are so located as to close the said contacts at times when the circuits through their own reversing switches are not changed.

When the switch $E'$ is again oscillated so as to disengage the contact $e'$ from the fixed contact $g^1$, and engage the contact $e^2$ with the contact $g^2$, the circuit through the coil $G^1$ of the reversing switch $F^1$ is interrupted, and the movable contacts $f^1$ and $f^2$ actuated thereby fall away, in the manner customary in the operation of such well known reversing switch mechanism, from the fixed contacts connected with the leads $b^1$ and $b^2$. A circuit is then closed through the lead from the contact $g^2$ to the coil $G^2$, to the lead $g^4$, movable contact $K^2$, then in its upper position, to lead $l^1$, and thence through the pairs of contacts $l^2$ and $l^3$, and $l^5$ and $l^6$, back to the busbar $a^5$. The energization of the coil $G^2$ actuates the reversing switch $F^1$ to reverse the motor $D^1$, and also moves downwardly the contact $K^2$ so as to complete the circuit of the coil $G^2$ directly through the lead $g$ to the lead $b^2$ and busbar $a^5$, without passing through the pairs of contacts $l^2$ and $l^3$, and $l^5$ and $l^6$.

From the foregoing description it will be observed that the circuit through the reversing switch each time the switch $E^1$ is actuated is only completed to effect a reversal of the motor $D^1$, when the movable members of the machines driven by the motors $D^2$ and $D^3$ have reached the predetermined positions necessary to close the pairs of contacs $l^2$ and $l^3$, and $l^5$ and $l^6$. Should the movable member of either of the machines $D^2$ or $D^3$ lag slightly behind the other, the closing of the circuit through the reversing switch $F'$ to actuate the same to start the motor $D^1$ in a reverse direction, would only be completed when the machine which lags catches up sufficiently to cause the cam disk rotated thereby to close the contacts in the circuit of the reversing switch $F^1$. The projections $s^1$—$s^2$ on the cam disks $S^1$—$S^2$ are sufficiently long to maintain the contacts which they control in closed position an interval of time adequate to compensate for any lagging in the operation of either of the machines which control the circuit of the reversing switch $F^1$.

Circuits of motor $D^2$.

The lead $c^3$ extends from the busbar $a^6$ to the motor $D^2$, and leads $c^4$ and $c^5$ connect the motor with pairs of movable contacts of the reversing switch $F^2$, so that the said leads are alternatively connected through the reversing switch with the lead $c^1$—$c^2$, and thence with the busbars $a^4$ and $a^5$.

When the switch $E^2$ is in the position shown in full lines, the circuit is completed from the lead $c^1$ through the push-button switch $H^2$, movable contact $e^1$, fixed contact $g^1$, through the connecting lead to the coil $G^1$ of the reversing switch $F^2$, thence through the lead $g^5$, movable contact $K^1$, lead $g$ to lead $c^2$, and thence to busbar $a^5$, completing the circuit through the reversing switch and holding the same in position to continue the current to the motor $D^2$, to rotate the same in a given direction until the switch $E^2$ has been oscillated. When the switch $E^2$ is oscillated to break the circuit at the contacts $e^1$ and $g^1$, and close the circuit through the contacts $e^2$ and $g^2$, the current passes to the coil $G^2$ of the reversing switch $F^2$, and thence through the lead $g^4$, movable contact $K^2$, lead $m^1$, to movable contact $m^2$, fixed contact $m^3$, lead $m^4$, to movable contact $m^5$, to fixed contact $m^6$, to lead $m^7$, thence through lead $d^2$, to busbar $a^5$, completing the circuit through the coil $G^2$ of the reversing switch $F^2$, and actuating the latter to reverse the current of the motor $D^2$. The circuit through the coil $G^2$ is, however, only completed when the positions of the movable members of the machines driven by the motors $D^1$ and $D^3$ are such as to close the respective pairs of contacts $m^2$ and $m^3$, and $m^5$ and $m^6$. The energization of the coil $G^2$ effects the lowering of the contact $K^2$ so as to close the circuit from the lead $g^4$ directly to the lead $g$, and thence to the lead $c^2$ to the busbar $a^5$, thereby continuing the circuit through the coil $G^2$, and maintaining the circuit of the motor $D^2$ until the switch $E^2$ has been again oscillated.

Circuits of motor $D^3$.

A lead $d^3$ extends from the busbar $a^6$ to the motor $D^3$, and leads $d^4$ and $d^5$ connect the motor through the reversing switch $F^3$ with the leads $d^1$ and $d^2$, connected with the busbars $a^4$ and $a^5$. The reversing switch, when actuated serves to connect the lead $d^4$ alternately with the leads $d^1$ and $d^2$, and simultaneously alternately connect the lead $d^5$ with the leads $d^2$ and $d^1$. The oscillating switch $E^3$ serves to alternately make and break the circuits through the coils $G^1$ and $G^2$ of the reversing switch $F^3$. The circuit through each of said coils is, however, only initially established as follows: Lead $n^1$ through movable contact $n^2$, fixed contact $n^3$, lead $n^4$ to movable contact $n^5$, to fixed contact $n^6$, to lead $n^7$, through lead $b^2$ to busbar $a^5$. Consequently the reversing switch $F^3$ is only actuated to start the motor $D^3$ in a reverse direction when the positions of the movable members of the machines driven by the motors $D^1$ and $D^2$ are such as to close the respective pairs of contacts $n^5$ and $n^6$, and $n^2$ and $n^3$.

The push-button switch $H^1$ is operatively connected with a pair of contact plates $h^1$, which, when the switch is open, close short-circuits around the pairs of contacts $m^2$ and $m^3$, and $n^5$ and $n^6$, thereby eliminating the control of the circuits of the reversing switches $F^2$ and $F^3$, whenever the operation of the machine actuated by the motor $D^1$ is discontinued. In a similar manner a push-button switch $H^2$ is operatively connected with a pair of contact plates $h^2$, which, when the switch is open, close short-circuits around the pairs of contacts $n^2$ and $n^3$, and $l^5$ and $l^6$, thereby eliminating the control of the circuits of the reversing switches $F^1$ and $F^3$ by the machine operated by the motor $D^2$, when the operation of the same is discontinued. The push-button $H^3$ is in a similar manner operatively connected with a pair of contact plates $h^3$, which, when the switch is open, and the operation of the machine driven by the motor $D^3$ discontinued, close short-circuits around the pairs of contacts $l^2$ and $l^3$, and $m^5$ and $m^6$, thereby eliminating the control of the circuits of the reversing switches $F^1$ and $F^2$ by the machine driven by the motor $D^3$, when the operation of the same is discontinued.

In lieu of connecting each of the push-button switches $H^1$, $H^2$ and $H^3$ with pairs of contact plates for short-circuiting the respective pairs of contacts actuated by the machines, the circuits of the motors of which are controlled by the said respective push-button switches, I may employ a relay system, as shown in Fig. 7. In said system the short-circuiting contact plates are designated $v^1$ and $v^2$, which are connected with the plunger $v$ of a solenoid V, the coil of the latter being in a circuit controlled by the push-button switch H. When the switch H is closed, the contact plate $v^1$ closes the circuit to the fulcrum of the oscillatory switch F, which makes and breaks the circuits of the reversing switch. When the switch H is open, the contact plates $v^1$ and $v^2$ close short-circuits around the pairs of contacts in the circuits of the reversing switches of the other machines, the circuit to the switch F being simultaneously interrupted by the said movement of the contact plate $v^1$.

From the foregoing description it will be observed that my invention secures the reversing of a number of machines in predetermined sequence, thereby precluding the reversing of any two machines in the group simultaneously. It will be further observed that each machine periodically initiates a reversing of its direction of movement, but such reversal is only completed through controlling means actuated by the other machines in the group. It will be further seen that by my invention the operation of any one machine may be discontinued without interfering with the proper serial reversing of the machines remaining in operation, the discontinuance of the operation of any one machine serving to simultaneously eliminate from the control of said machine the reversing of the other machines.

While I have described my invention with more or less minuteness and as being embodied in certain precise forms, yet it will be understood that I do not limit myself thereto unduly, or any more than is pointed out in the claims; on the contrary, I contemplate all proper changes in form, construction, and arrangement, the omission of immaterial parts, and the substitution of equivalents, as circumstances may suggest or necessity render expedient.

I claim:—

1. The combination with a plurality of rotary elements, of separate driving means for each element, means controlled by the rotation of each element to periodically reverse the direction of its rotation, and means for controlling the reversing of each element actuated by the rotation of all of the other elements.

2. The combination with a plurality of rotary elements, of separate driving means for each of said elements, and means controlled by the rotation of all of the several elements for reversing the direction of rotation of individual elements in succession.

3. The combination with a plurality of rotary elements, of a separate motor for driving each element, means controlled by the rotation of each element to periodically reverse its own driving motor, and means for governing the reversing of the motor of each element controlled by the rotation of each of the other elements.

4. The combination with a plurality of rotary elements, of separate motors for rotating said elements, and means controlled by the rotation of all of the several elements for reversing their driving motors in succession.

5. The combination with a plurality of rotary elements, of a separate electric motor operatively connected with each element, a circuit for each of said electric motors, and mechanism controlling the circuit of each motor to reverse the direction of rotation thereof, said mechanism being governed by the rotation of all of said elements.

6. The combination with a plurality of rotary elements, of separate electric motors operatively connected with said elements, a circuit for each of said electric motors, means actuated by the rotation of each element to periodically reverse the direction of rotation of its own driving motor, and means governing the reversing of the motor of each element actuated by the rotation of each of the other elements.

7. The combination with a plurality of rotary elements, of a separate electric motor for rotating each element, a circuit for each of said motors, a reversing switch controlling each motor circuit, a circuit for said switch, means actuated by the rotation of each element for periodically controlling the circuit of the reversing switch of its own motor, and means controlling the circuit of the motor of each element actuated by the rotation of all of the other elements.

8. The combination with a plurality of rotary elements, of a separate electric motor for driving each element, a circuit for each motor, a switch for interrupting the circuit of each motor to discontinue the operation of the element rotated thereby, switches actuated by each element for controlling the circuit of the motor of each of the other elements, and means automatically actuated upon the discontinuance of the operation of any one element to eliminate the control by said element of the circuits of the motors of the other elements.

9. The combination with a plurality of rotary elements, of separate driving means for each element, means controlled by the rotation of each element to periodically reverse the direction of its rotation, means for controlling the reversing of each element actuated by the rotation of all of the other elements, means to discontinue the operation of any element, and means automatically actuated upon the discontinuance of operation of any element to eliminate the control by said element of the operation of the other elements.

10. The combination with a plurality of cylinder washing machines, of a separate electric motor for rotating the cylinder of each machine, a circuit for each of said motors, a reversing switch, means actuated by the rotation of each cylinder for periodically controlling the circuit of the reversing switch of its own motor, means controlling the circuit of the motor of each machine actuated by the rotation of the cylinders of all of the other machines, a switch for interrupting the circuit of each motor to discontinue the operation of the machine actuated thereby, and means automatically actuated upon the discontinuance of operation of any one machine to eliminate the control by said machine of the circuits of the motors of the other machines.

11. The combination with a plurality of rotary elements, of separate motors for rotating said elements, means controlled by the rotation of all of the several elements for reversing their driving motors in succession, means to discontinue the operation of the motor of each of said elements, and means automatically actuated upon the discontinuance of the operation of the motor of any element to eliminate the control by said element of the operation of the motors of the other elements.

12. The combination with a plurality of rotary elements, of separate electric motors operatively connected with said elements, a circuit for each of said electric motors, means actuated by the rotation of each element to periodically reverse the direction of rotation of its own driving motor, means governing the reversing of the motor of each element actuated by the rotation of each of the other elements, a switch for interrupting the circuit of each motor to discontinue the operation of the element rotated thereby, and means automatically actuated upon the discontinuance of operation of any one element to eliminate the control by said element of the motors of the other elements.

In testimony whereof I have subscribed my name.

FRITZ BALZER.

Copies of this patent may be obtained for five cents each, by addressing the "Commissioner of Patents, Washington, D. C."